United States Patent
Kaup

[11] Patent Number: 6,035,073
[45] Date of Patent: *Mar. 7, 2000

[54] METHOD FOR FORMING AN IMAGE TRANSFORMATION MATRIX FOR AN ARBITRARILY SHAPED IMAGE SEGMENT OF A DIGITAL IMAGE WITH A COMPUTER

[75] Inventor: Andre Kaup, Hoehenkirchen, Germany

[73] Assignee: Siemens Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/820,344

[22] Filed: Mar. 12, 1997

[30] Foreign Application Priority Data

Mar. 13, 1996 [DE] Germany .............. 196 09 859

[51] Int. Cl.$^7$ ...................................................... G06K 9/36
[52] U.S. Cl. .......................................... 382/276; 382/232
[58] Field of Search ..................... 382/276–278, 382/259, 232, 250–251, 239, 248, 300, 165; 358/432–433, 426; 348/395, 403, 420, 416; 345/431, 441

[56] References Cited

U.S. PATENT DOCUMENTS

| 4,809,348 | 2/1989 | Meyer et al. ............................. 382/259 |
| 4,998,286 | 3/1991 | Tsujiuchi et al. ........................ 382/165 |
| 5,208,872 | 5/1993 | Fisher ....................................... 382/300 |
| 5,265,217 | 11/1993 | Koukoutsis et al. .................... 704/200 |
| 5,387,937 | 2/1995 | Dorricott et al. ........................ 348/395 |
| 5,432,893 | 7/1995 | Blasubramanian et al. ............ 345/431 |
| 5,583,951 | 12/1996 | Sirat et al. ............................... 382/232 |

OTHER PUBLICATIONS

"Coding of Arbitrarily Shaped Image Segments Based on a Generalized Orthogonal Transform," Gilge et al, Signal Processing: Image Communication vol. 1 (1989), p. 153–180.

"Efficiency Of Shape–Adaptive 2–D Transforms for Coding of Arbitrarily Shaped Image Segments," Sikora et al, IEEE Trans. On Circuits and Systems For Video Tech., Vol. 5, No. 3, Jun. 1995, p. 254–258.

"Shape–Adaptive DCT for Generic Coding of Video," Sikora et al, IEEE Trans. on Circuits and Systems For Video Tech., vol. 5, No. 1, Feb. 1995,pages 59–62.

"Numerical Recipes in Pascal," Press et al (1992),p. 375–389.

"Digitale Bildcodierung," Ohm (1995), p. 46–51 and 72–77.
"Einführing in die digitale Bidverarbeitung," Ernst, (1991) p. 250–252.

"Pattern Recognition," Dekker (1984) p. 213–217.

*Primary Examiner*—Leo H. Boudreau
*Assistant Examiner*—Ishrat Sherali
*Attorney, Agent, or Firm*—Hill & Simpson

[57] ABSTRACT

In a method for forming an image transformation matrix for an arbitrarily shaped image segment of a digital image with a computer, a prescribable scan sequence is determined for the picture elements of an image segment of the digital image, a covariance matrix for the picture elements is determined on the basis of this scan sequence. An image transformation matrix is derived from the covariance matrix on the basis of the eigenvectors of the covariance matrix.

9 Claims, 3 Drawing Sheets

METHOD FOR FORMING AN IMAGE TRANSFORMATION MATRIX FOR AN ARBITRARILY SHAPED IMAGE SEGMENT OF A DIGITAL IMAGE WITH A COMPUTER

BACKGROUND OF THE INVENTION

1. Field of the Invention

The present invention is directed to a method for encoding video signals, and in particular to a method for forming an information transformation matrix for an arbitrarily shaped image segment of a digital image using a computer.

2. Description of the Prior Art

The encoding of video signals according, for example, to the image encoding standards H.261, H.263, MPEG1 as well as MPEG2 is often based on a block-oriented discrete cosine transformation (DCT). These block-oriented encoding methods, however, are not suitable for image encoding which is not based on rectangular blocks but wherein, for example, subjects from an image are segmented and the segments of the image are encoded. These latter methods are known as region-based (region-oriented) or subject-based (subject-oriented) image encoding methods. A segmenting of subjects in digital images thereby ensues according to the subjects occurring in the scene. A separate encoding of these segmented subjects is implemented instead of the encoding of image blocks as in block-based image encoding methods. The encoding thereby usually ensues by modeling the segmented subjects and subsequent transmission of the modeling parameters of these segmented subjects.

After the transmission of the image information from a transmitter to a receiver, the individual subjects of the image are in turn reconstructed in the receiver on the basis of the transmitted modeling parameters.

One possibility for modeling the subjects is a series development of the image function according to a set of suitably selected basic functions. The modeling parameters then correspond to the development coefficients of these image functions. Such a modeling of the image is the basis of the transformation encoding. When individual, arbitrarily bounded subjects of the image are to be encoded, a transformation for segments with arbitrary, usually not convex, bounds is required.

Two basic approaches have heretofore existed for such a transformation.

In the method that is described in M. Gilge, T. Engelhardt and R. Mehlan, Coding of arbitrarily shaped image segments based on a generalized orthogonal transform, Signal Processing: Image Communication 1,00. 153–180, October 1989, the given image segment is first embedded into a circumscribing rectangle with the smallest possible dimensions. A discrete cosine transformation (DCT) that is completely specified by the basic functions of the transformation can be recited for this rectangle. In order to match this transformation to the segment shape, the basic functions defined on the rectangle are successively orthogonalized with respect to the shape of the segment. The resulting orthogonal, shape-dependent basic functions then form the segment-matched transformation that is sought.

One disadvantage of this approach is that there is a large capacity and a large memory space needed for the implementation of this method. Further, this known method exhibits the disadvantage that no reliable statements can be made about the resultant transformation for data compression, since the transformation is essentially dependent on the orthogonalization sequence, and thus on the specific implementation.

T. Sikora and Bela Makai, Shape-adaptive DCT for generic coding of video, IEEE Trans. Circuits and Systems for Video Technology 5, pp. 59–62, February 1995 describes a method wherein the given image segment is transformed separated according to rows and columns. To that end, all rows of the image segment are first left-justified and are successively subjected to a one-dimensional horizontal transformation whose transformation length respectively corresponds to the number of picture elements in the corresponding row. The resultant coefficients are subsequently transformed a second time in the vertical direction.

This method has the disadvantage that the correlations of the brightness values of the picture elements (similarities of the picture elements) cannot be fully exploited because of the resorting of the picture elements.

For improving this method known from Sikora et al., T. Sikora, S. Bauer and Bela Makai, Efficiency of shape-adaptive 2-D transforms for coding of arbitrary shaped image segments, IEEE Trans. Circuits and Systems for Video Technology 5, pp. 254–258, June 1995 describe a method wherein a transformation for convex image segment shapes adapted to a simple image model is implemented. Only image segment shapes that exhibit no interruptions (holes) upon traversal of rows or columns, however, are allowed in this method.

A considerable disadvantage that underlies both known approaches is that the energy concentration in the coefficients turns out lower than in the case of an optimum exploitation of all linear correlations. This is caused by the unfavorably selected basic functions given the method known from Gilge et al., the resorting of the picture elements given the first-discussed Sikora et al. article and the limitation to convex images regions given the second-discussed Sikora et al. article.

As a consequence thereof, the described, known methods do not achieve the best possible image quality at a given data rate as measured by the signal-to-noise ratio.

Further, various possibilities are known for determining the eigenvectors of a covariance matrix, for example from W. H. Press, S. Teukolsky and W. Vetterling, Numerical Recipes in Pascal, Cambridge University Press, pp. 375–389, 1992.

Various, known image transformation methods are described in J. -R. Ohm, Digitale Bildcodierung, Berlin Springer Verlag, ISBN 3-540-58579-6, pp. 46–51 and pp. 72–77, 1995.

The use of the Karhunen-Loeve transformation is known from M. Dekker, BOW "Pattern Recognition" Inc. 1984, pp. 213–217. The use of principal axis transformation is known from Ernst, Einführing in die digitale Bildverarbeitung, Franzis-Verlag, 1991, pp.250–252.

SUMMARY OF THE INVENTION

An object of the present invention is to provide a method for forming an image transformation matrix with which an improved signal-to-noise ratio is achieved compared to the known methods.

The above object is achieved in accordance with the principles of the present invention in a method for forming an image transformation matrix for an arbitrarily shaped image segment containing an arbitrary number of picture elements in a digital image including the steps, practiced in a computer, of defining a scan sequence of the picture elements in an image, forming a covariance matrix for the picture elements according to the scan sequence, and forming an image transformation matrix from the covariance matrix by determining the eigenvectors of the covariance matrix.

A scan sequence for scanning the individual picture elements that comprise an image segment is thereby defined for each image segment. A covariance matrix for the picture elements is formed corresponding to the scan sequence and, after a determination of the eigenvectors for the covariance matrix, the inventive image transformation matrix is derived from the eigenvectors of the covariance matrix.

The image transformation matrix formed in the inventive way has the property that the individual picture elements of the image segment are optimally completely linearly decorrelated by the transformation implemented with the image transformation matrix. A further advantage of the inventive method is that, for a given data rate, the signal-to-noise ratio is considerably improved compared to known transformations.

It is advantageous to form the elements of the covariance matrix according to the rule $R(x_{ij}, x_{kl}) = r^{|i-k|+|j-l|}$, since a decoupling of the individual directions of the calculation of the elements of the covariance matrix is possible in this way. A parallelization of the implementation of the formation of the covariance matrix, and thus a considerable acceleration of the implementation of the method with a computer is also achieved in this way.

In a further version of the method, a shape-matched two-dimensional cosine transformation is defined from the image transformation matrix of the inventive method by fixing the value of the pixel correlations to the value 1.

It is also advantageous to sort the coefficients according to descending eigenvalues for encoding the individual coefficients of an image segment transformed using the image transformation matrix. This saves substantially in terms of the required transmission rate in the transmission of the individual coefficients since the outlay for encoding interspaces wherein only "zero coefficients" occur is considerably reduced because there are substantially fewer zero coefficients between the individual coefficients.

DESCRIPTION OF THE PREFERRED EMBODIMENTS

The assumption of a separable, two-dimensional Markoff set of the first order as image model for picture elements BP of the respective digital image B is made for the inventive method. The picture elements BP are elements of an arbitrary image segment S with an arbitrary shape that is also non-convex or multiply connected.

In the inventive method, a prescribable scan sequence for the picture elements BP of the respective image segment S that is formed by an arbitrary number of picture elements is defined in a first step 101. This, for example, can be accomplished by scanning the individual picture elements BP of the image segment S line-by-line. This line-by-line scanning is only an example, however, which serves for simplification of the inventive method and does not limit the universal validity of the scan sequences in any way. The scan sequence can be arbitrarily fixed.

A "segment-specific" covariance matrix R is now determined in step 102 for the image segment S. This occurs by taking the previously determined scan sequence is taken into consideration in the formation of the covariance matrix R that corresponds to the scan sequence. A first row of the covariance matrix R is obtained by evaluating covariance function $R(x_{ij}, x_{kl})$ for a first image pixel $x_{ij}$ of the image segment S for all picture elements BP of the image segment S. The coordinate position of a first picture element $x_{ij}$ is thereby described with a first row index i and a first column index j. The respective coordinate positions of all other picture elements BP of the image segment S are described with a second row index i and a second column index j.

The sequence of the selection of the first picture element $x_{ij}$ and of a second picture element $x_{kl}$ in the formation of the covariance matrix R ensues according to the previously defined scan sequence. The number of elements in the first row of the covariance matrix R thus just corresponds to the number of picture elements within the image segment. The determination of a second row of the covariance matrix R ensues analogously, as does the determination of all further rows of the covariance matrix R. The second picture element $x_{kl}$ is "held fast" in the second row of the covariance matrix R and the covariance function $R(x_{ij}, k_{kl})$ is in turn determined for all other picture elements BP.

This procedure is implemented for all n rows of the covariance matrix R, whereby the number n simultaneously represents the number of picture elements BP in the image segment S of the image B.

An image transformation matrix $A^T$ is then determined row-by-row from the eigenvectors of the covariance matrix R in step 103. This means that the basic functions of the transformation correspond to the eigenvectors of the covariance matrix R.

Those skilled in the art know of various possibilities for determining the eigenvectors of the covariance matrix R, for example from the aforementioned Press et al. publication.

Figure 2:
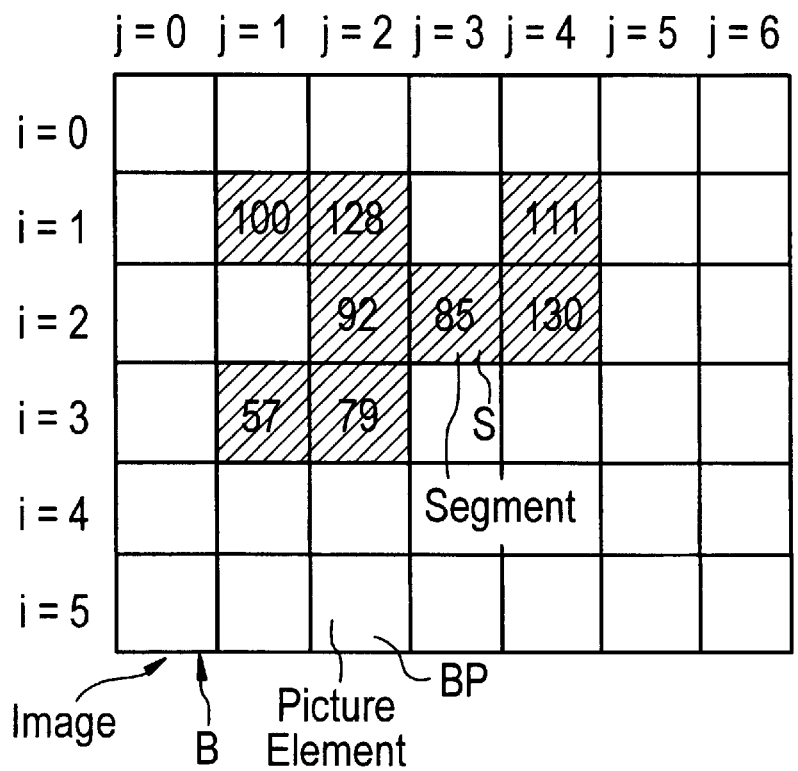
FIG. 2 schematically illustrates an image with individual picture elements and an image segment is shown as an example for explaining the inventive method.

FIG. 2 shows a very simple example of an image B that contains an arbitrary plurality of picture elements BP and an image segment S with n picture elements within the image B.

A brightness value and/or a color value with which the brightness and/or the color of the respective picture element BP is indicated is respectively allocated to the picture elements BP in the form of a numerical value that usually lies between 1 and 255.

In FIG. 2, each picture element BP that is located in the image segment S is identified with shading.

For illustration of the inventive method, this method shall be described with the numerical values that are shown by way of example in FIG. 2 for the image segment S in the image B. This trivial example is merely intended to illustrate the procedure and does not limit the universal validity of the inventive method in any way whatsoever.

The brightness values are first combined in an arbitrary but fixed scan sequence to form a picture element vector x, line-by-line in this example. The picture element vector x accordingly is derived as $$x = (x_{11}, x_{12}, x_{14}, x_{22}, x_{23}, x_{24}, x_{31}, x_{32})^T = (100, 128, 111, 92, 85, 130, 57, 79)^T$$

The individual picture elements BP within the image B are respectively unambiguously identified with the two subscript indices at every component $x_{ij}$ of the picture element vector x, namely by the first row index i as well as by the first column index j. In the example of FIG. 2, the first row index i is a number between 0 and 5, generally between 0 and m−1, whereby m references the number of image lines of the image B. In the image B shown in FIG. 2, the first column index j is a number between 0 and 6 but generally a number between 0 and t−1, whereby t references the number of image columns of the image B.

The individual elements of the covariance matrix B are determined with a covariance function $R(x_{ij}, x_{kl})$. Those skilled in the art are aware of a variety of covariance functions. For simple presentation of the inventive method, a formation of the elements of the covariance matrix R on the basis of the following covariance function R is shown:

$$r(x_{ij}, x_{kl}) = r^{|i-k|+|j-l|} \quad (1)$$

r thereby references an arbitrary number with $|r| \leq 1$.

Using of this covariance function R, the following derives for the covariance matrix R given the selected numerical example from FIG. 2:

$$R = \begin{bmatrix} 1 & r & r^3 & r^2 & r^3 & r^4 & r^2 & r^3 \\ r & 1 & r^2 & r & r^2 & r^3 & r^3 & r^2 \\ r^3 & r^2 & 1 & r^3 & r^2 & r & r^5 & r^4 \\ r^2 & r & r^3 & 1 & r & r^2 & r^2 & r \\ r^3 & r^2 & r^2 & r & 1 & r & r^3 & r^2 \\ r^4 & r^3 & r & r^2 & r & 1 & r^4 & r^3 \\ r^2 & r^3 & r^5 & r^2 & r^3 & r^4 & 1 & r \\ r^3 & r^2 & r^4 & r & r^2 & r^3 & r & 1 \end{bmatrix}$$

The value of the covariance function $R(x_{11}, x_{11}) = R^{|1-1|+|1-1|} = 1$, for example, derives for the first element in the first row of the covariance matrix R.

Those skilled in the art know of a variety of methods for determining the eigenvectors from the covariance matrix R which can be used without restrictions in the inventive method.

When the eigenvectors are sorted in ascending sequence according to the size of the eigenvalues, which is not compulsory for the inventive method, then the following derives in the simple example shown here for the image transformation matrix $A^T$ for a given value r=0.95:

x with the image transformation matrix $A^T$, the following derives for the numerical example shown here:

$$y = A^T x = (19.026 \; 19.2285 \; 20.3278 \; -11.2088 \; 11.0457 \; 28.1784 \; -46.0299 \; 27.5481)$$

Another of many possibilities for determining the individual elements of the covariance matrix R, i.e. a possibility of the covariance function $R(x_{ij}, x_{kl})$, derives from the following rule:

$$R(x_{ij}, x_{kl}) = r^{\sqrt{(i+k)^2 + (j-l)^2}}$$

The covariance function $R(x_{ij}, x_{kl})$ according to Equation (1), however, exhibits the advantages that, first, the directions of the individual picture elements are decoupled, and thus determination of the elements of the covariance matrix R in parallel is possible, which leads to an accelerated implementation of the inventive method.

Figure 3:
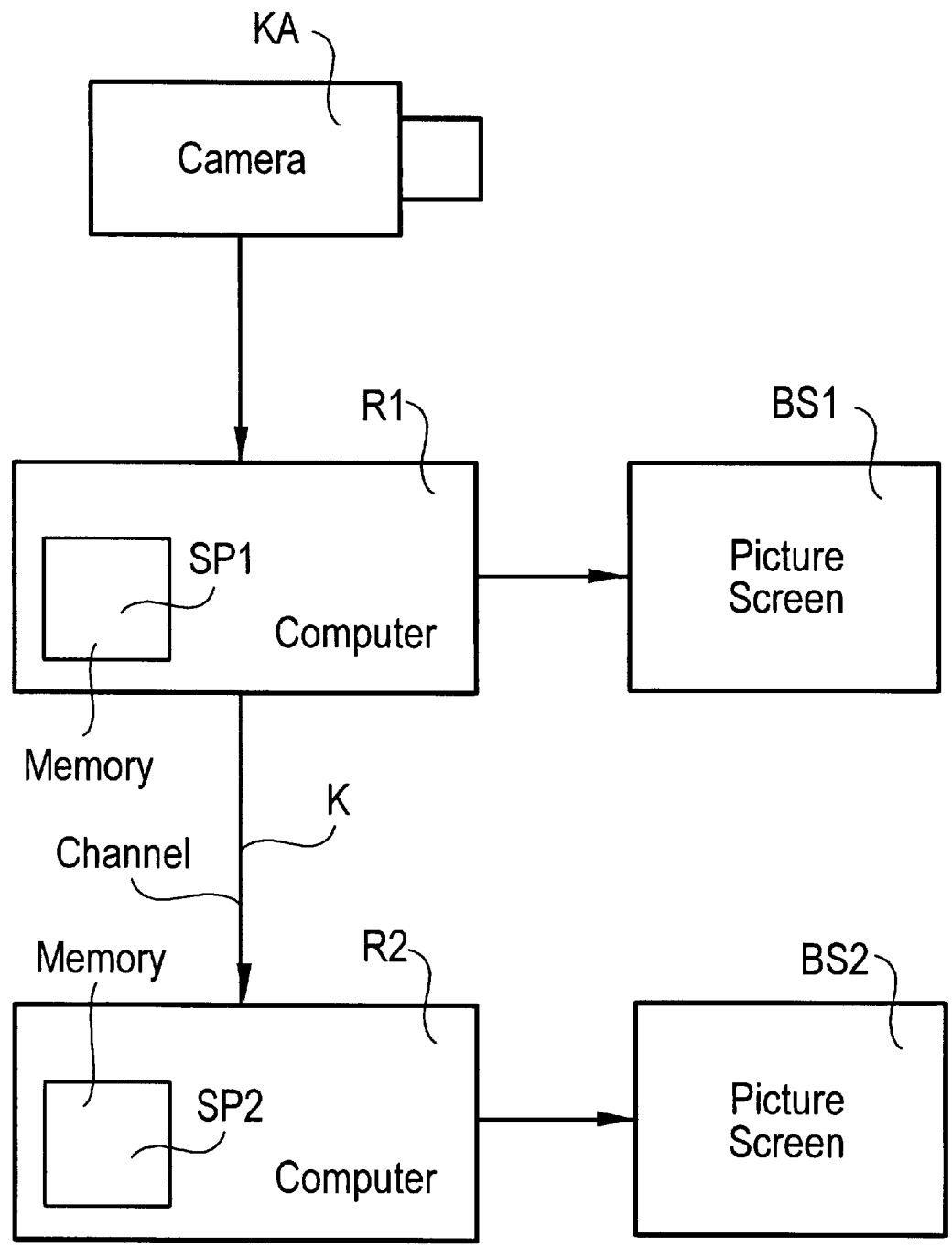
FIG. 3 shows an arrangement with a camera, two computers and two picture screens for practicing the inventive method.

Among other things, FIG. 3 shows a computer R1 with which the inventive method is necessarily implemented.

FIG. 3 also shows a camera KA with which a sequence of images is registered that is converted into a sequence of digital images B in the computer R1. These digital images B are stored in a memory SP1 of the computer R1. A picture screen BS1 is also provided for the computer R1 in this arrangement.

Given a transmission of the digitized image B, an image transformation using the inventively formed image transformation matrix $A^T$ is implemented before the transmission. A second computer R2 with a second memory SP2 and a second picture screen BS2 is also provided, this being coupled to the computer R1 via a channel K.

Figure 4:
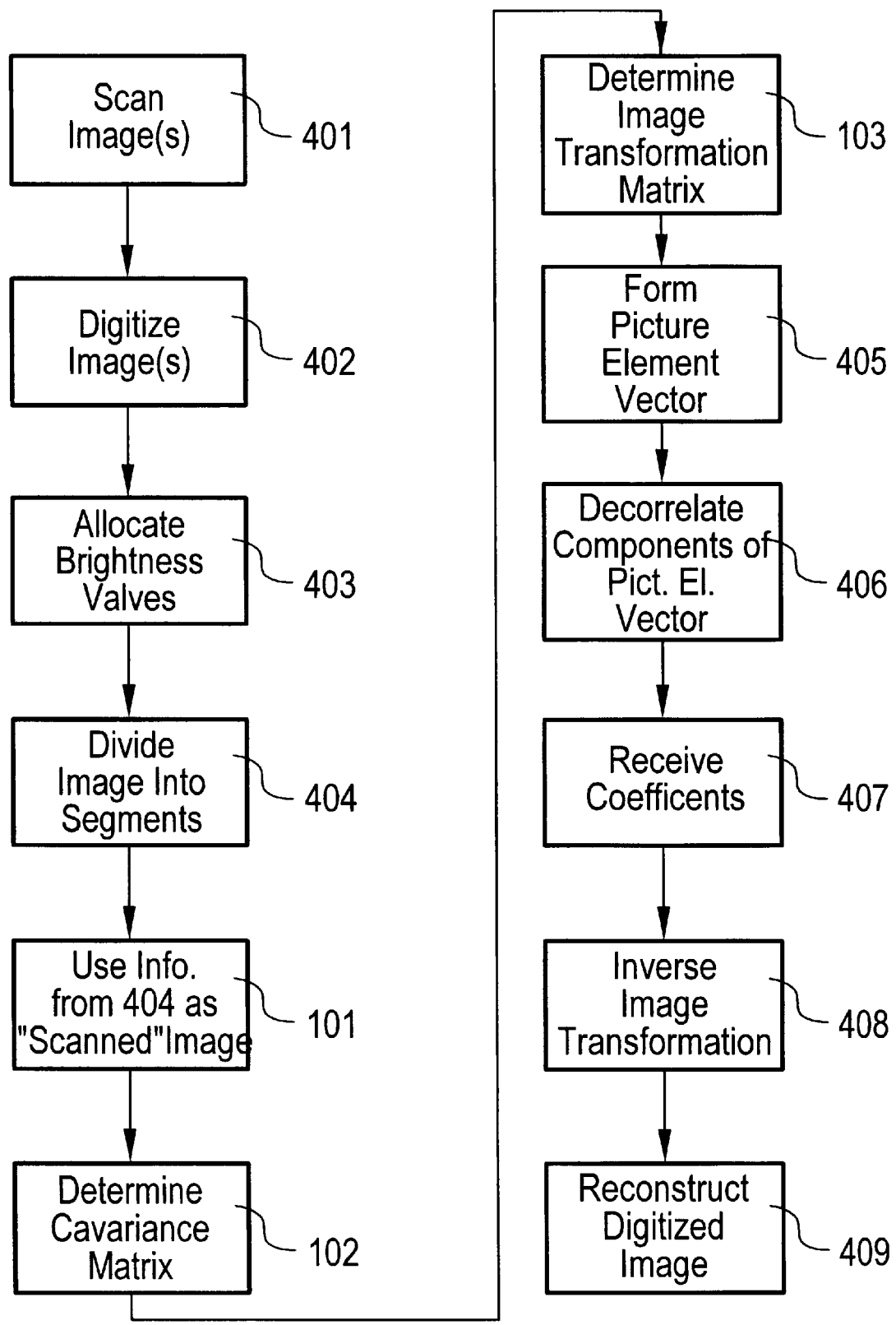
FIG. 4 is a flowchart in which additional method steps of another embodiment of the inventive method are shown.

FIG. 4 shows a few additional method steps of modifications of the inventive method. For example, one or more images can be registered in step 401 with the camera KA. The image or the images are digitized in step 402 in the computer R1, and the individual picture elements BP of the image B have brightness values allocated to them in step 403. The digitized image B is now divided in step 404 into individual image segments S.

Figure 1:
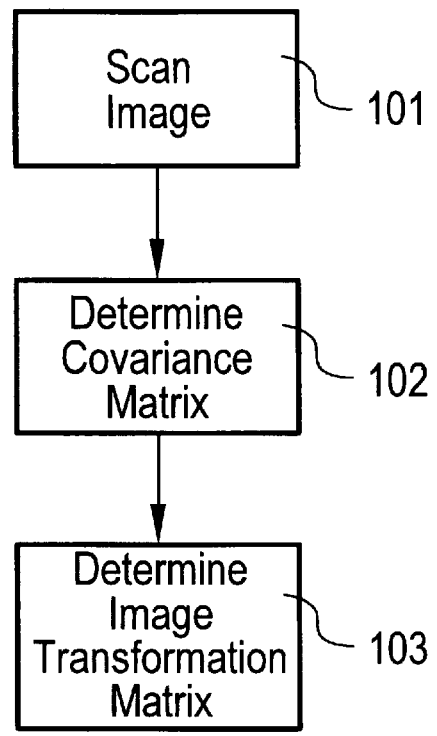
FIG. 1 is a flowchart in which the individual methods steps of the inventive method are shown.

A segment-specific image transformation matrix $A^T$ is now respectively inventively formed for each individual image segment S in the way shown in FIG. 1 with the steps 101, 102 as well as 103.

The picture element vector x is transformed in step 405 to the decorrelated picture element vector y with the image transformation matrix $A^T$. The coefficients resulting therefrom, i.e. the components of the decorrelated picture $$A^T = \begin{bmatrix} -0.3175 & 0.6326 & -0.3242 & -0.3284 & 0.0003 & 0.3210 & 0.3105 & -0.2942 \\ 0.3958 & -0.0072 & -0.3804 & -0.4294 & 0.0030 & 0.3858 & -0.4102 & 0.4439 \\ 0.0766 & -0.0848 & -0.1772 & 0.5289 & -0.6393 & 0.4895 & -0.0339 & -0.1624 \\ 0.3711 & 0.2890 & -0.3967 & 0.1468 & 0.5282 & 0.1021 & 0.0806 & -0.5514 \\ -0.2064 & 0.4306 & -0.3112 & 0.4957 & 0.2389 & -0.2389 & -0.5544 & 0.0953 \\ 0.6164 & 0.4394 & 0.2397 & -0.1290 & -02829 & -0.3027 & -0.1960 & -0.3780 \\ 0.2324 & 0.0424 & -0.5362 & 0.1089 & -0.2153 & -0.4775 & 0.5121 & 0.3290 \\ 0.3500 & 0.3590 & 0.3458 & 0.3636 & 0.3590 & 0.3502 & 0.3459 & 0.3546 \end{bmatrix}$$

The respective picture element vector x of the image segment can now be transformed with the image transformation matrix $A^T$, whereby the individual picture elements BP are completely linearly decorrelated.

For a decorrelated picture element vector y, which is determined by transformation of the picture element vector element vector y, are transmitted in step 406 from the computer R1 to the second computer R2 via the channel K. The coefficients are received in step 407 in the second computer R2 and inversely transformed in step 408 according to the inverse image transformation matrix $(A^T)^{-1}$. The digitized image B is reconstructed in step 409 on the basis of the reconstructed picture element vectors x that have now been determined again. This image is displayed to a user on the second picture screen BS2 or on the first picture screen BS1.

In a further version of the method, it is also advantageous to sort the coefficients of the image transformation matrix $A^T$ according to descending eigenvalues. A considerable amount of transmission capacity is saved by this procedure. Usually, the coefficients of the image segment S transformed with an arbitrary image transformation matrix are subjected to a quantization and a subsequent scan process. Zero coefficients that arose due to the quantization are thereby encoded such that the number of zero coefficients are encoded as a natural number between the coefficients whose values are unequal to zero. When a large number of zero coefficients lies between two "non-zero" coefficients, a considerable number of bits are required for encoding this natural number and, of course, these must be transmitted. The number of zero coefficients between non-zero coefficients is considerably reduced by the sorting according to the descending eigenvalues. The need for transmission rate that is present for the encoding of the large natural numbers is thus also considerably reduced.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for forming an image transformation matrix for an arbitrarily shaped image segment that comprises an arbitrary plurality of picture elements in a digital image, using a computer, comprising the steps of:

conducting a scan of individual picture elements in an arbitrarily shaped image segment of an image in a picture element-by-picture element scan sequence of the picture elements at least in the arbitrary image segment;

forming a covariance matrix for the picture elements according to the scan sequence; and forming an image transformation matrix from the covariance matrix by determining the eigenvectors of the covariance matrix.

2. A method as claimed in claim 1 comprising the additional steps of:

allocating brightness values and/or color values to the picture elements;

forming a picture element vector from the brightness values and/or color values according to the scan sequence; and transforming the picture element vector with the image transformation matrix to form a decorrelated picture element vector.

3. A method as claimed in claim 2 comprising the additional steps of:

registering said image with a camera;

dividing said image into image segments;

transmitting said decorrelated picture element vector from the computer to a further computer;

inversely transforming the decorrelated picture element vector at said further computer;

reconstructing a digital image at said further computer using the inversely transformed decorrelated picture element vector; and displaying the reconstructed digital image on a picture screen.

4. A method as claimed in claim 3, comprising defining said scan sequences by scanning along an image line using said camera.

5. A method as claimed in claim 1 comprising determining elements of the covariance matrix according to the following rule:

$$r(x_{ij}, x_{kl}) = r^{|i-k|+|j-l|}$$

wherein $R(x_{ij}, x_{kl})$ indicates a value of the covariance matrix, i,k, indicate row indices, and j,l indicate column indices.

6. A method as claimed in claim 5 comprising the additional step of normalizing elements of the covariance matrix.

7. A method as claimed in claim 1 whereby the elements of the covariance matrix are determined according to the following rule:

$$R(x_{ij}, x_{kl}) = r^{\sqrt{(i+k)^2 + (j-l)^2}}$$

wherein $R(x_{ij}, x_{kl})$ indicates a value of the covariance matrix, i,k, indicate row indices, and j,l indicate column indices.

8. A method as claimed in claim 7 comprising the additional step of normalizing elements of the covariance matrix.

9. A method as claimed in claim 1 comprising the additional step of sorting coefficients of the image transformation matrix $A^T$ according to descending eigenvalues.

* * * * *